Patented Sept. 20, 1932

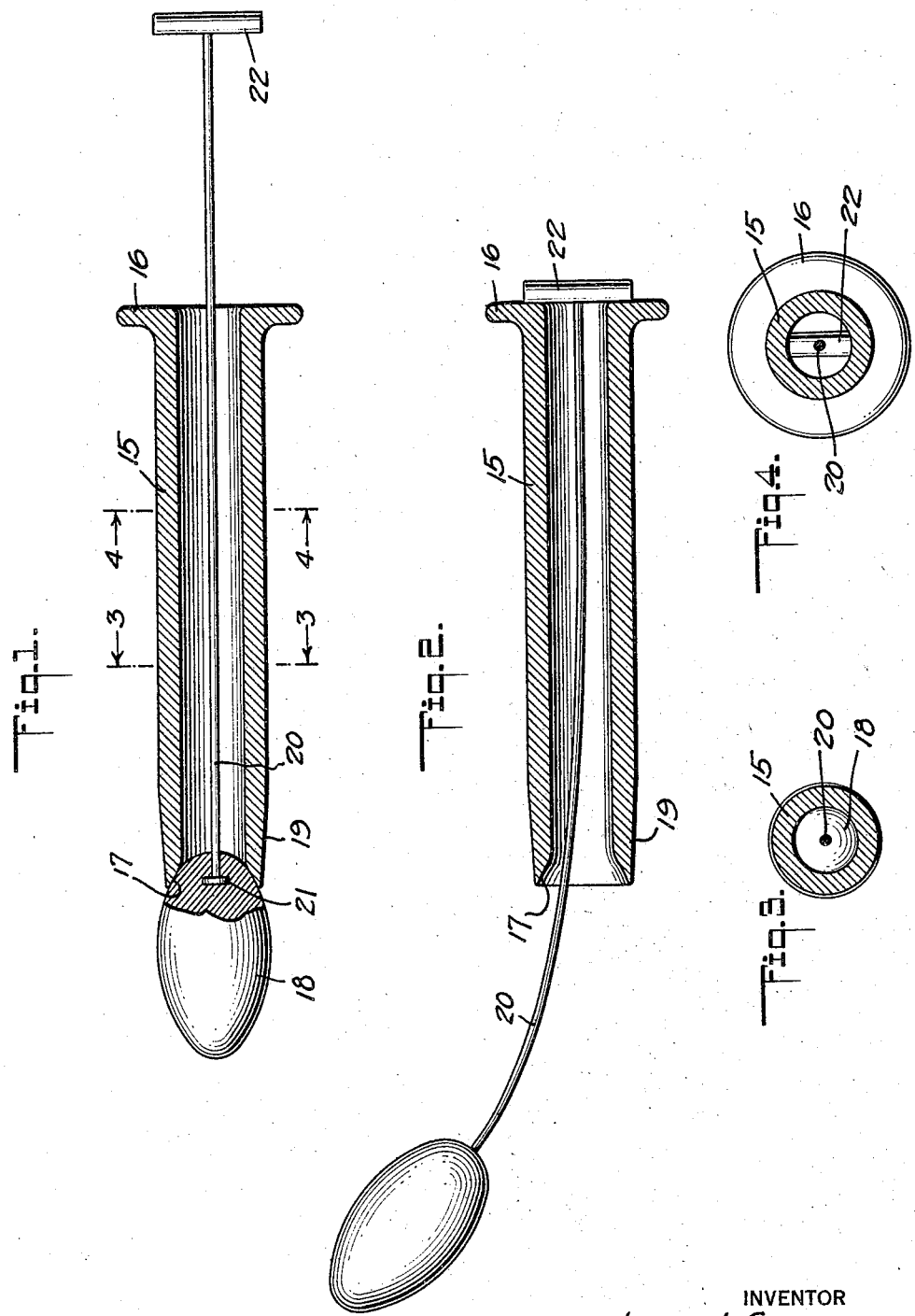

1,878,671

UNITED STATES PATENT OFFICE

JACOB J. CANTOR, OF LOS ANGELES, CALIFORNIA, ASSIGNOR OF ONE-HALF TO JOHN MURRAY, OF LOS ANGELES, CALIFORNIA

DILATOR

Application filed July 2, 1929. Serial No. 375,483.

My invention has reference to tubular dilators as used in surgery for opening body cavities to facilitate drainage thereof, inspection thereof, or the insertion of instruments thereinto.

A purpose of my invention is the provision of a dilator which is characterized by a tube having a retaining means therefor capable of occupying one position in which a part thereof acts to facilitate insertion of the tube and without injury to the walls of the cavity, and another position in which it acts effectually to retain the tube against accidental displacement from the cavity so that it will continue to perform its function of maintaining the cavity dilated.

I will describe only one form of dilator embodying my invention, and will then point out the novel features thereof in claim.

In the accompanying drawing:

Fig. 1 is a view showing one form of dilator embodying my invention with the tube thereof in longitudinal section and the retaining means in side elevation, and in that position which it assumes during insertion of the tube into a cavity.

Fig. 2 is a view similar to Fig. 1 showing the retaining means in extended position for retaining the tube within a cavity.

Figs. 3 and 4 are transverse sectional views taken on the lines 3—3 and 4—4 of Fig. 1 looking in the direction of the arrows.

In carrying out my invention, I provide a dilator comprising a tube 15 of any desired diameter and length and of any suitable material such as celluloid. The outer or trailing end of the tube is provided with an annular lip 16 as is customary in tubes of this character for limiting the movement of the tube inwardly in respect to a cavity. The inner or leading end of the tube has its edge chamfered inwardly to provide a conical seat 17. In this seat a dilating head formed of celluloid or other suitable sanitary material is adapted to fit in the manner illustrated in Fig. 1, so that the major axis of the head coincides with the major axis of the tube. In the present instance, the head 18 is shown as of ovate formation with its rear end disposed within the seat 17 while its small or pointed end projects forwardly so as to lead in the introduction of the head into a cavity to effect gradual dilation thereof and in advance of the tube 15, whereby insertion of the tube into the cavity is greatly facilitated. The maximum diameter of the head 18 exceeds the diameter of the leading end of the tube in order that the inner end edge of the tube will not have physical contact with the walls of the cavity as the tube is inserted, and as a consequence, the possibility of the tube edges scraping the walls of the cavity and injury to them is thus prevented.

In the present instance, I have shown the inner end of the tube slightly tapered as indicated at 19, so as to make the external diameter of the inner end of the tube less than the maximum diameter of the head, whereby a merging of the meeting ends of the tube and head is produced that prevents the inner edge of the tube from scraping the walls of the cavity.

As shown in Figs. 1 and 2, a resilient and normally curved wire 20 is connected at one end to the head 18 by embedding such end in the head and providing the end with an enlargement 21 to permanently retain the wire connected to the head. The opposite end of the wire is provided with a cross handle 22 which is adapted to be gripped in the manipulation of the wire to operate the head 18, and this handle is of such length as to span the open outer end of the tube and to thereby limit the inward movement of the wire.

In practice, the head 18 occupies the seated position shown in Fig. 1 during the insertion of the tube into a cavity, and by reason of its ovate form, it functions to dilate the walls of the cavity in advance of the tube to facilitate insertion of the latter and to protect the walls of the cavity against any scraping or other injurious action by the inner edge of the tube.

During insertion, pressure is exerted rearwardly along the major axis of the dilating head 18, so that it remains firmly on the seat 17. This action may be increased to insure against any lateral shifting of the head and pulling outwardly on the handle 22 to fully extend the wire 20, and thus pull the head against the seat. Following insertion of the tube into the cavity, it may be retained against displacement from the cavity by pushing the handle 22 inwardly, thereby advancing the wire 20 through the tube to cause the head 18 to occupy the projected position illustrated in Fig. 2. In this projected position, the head is offset or laterally disposed with respect to the tube 15, by reason of the fact that the wire 20 normally tends to curve, and consequently, when extended beyond the influence of the tube, it will cause the head to move in a curvilinear path as the wire is advanced. In consequence of this projected position of the head, it engages the walls of the cavity at such an angle as to provide an abutment which acts with the wire and handle to retain the tube against displacement from the cavity. The tendency of the wire to assume a curved form, operates to press the head against the wall of the cavity which further aids in causing the head to retain the tube against displacement.

By reason of the small diameter of the wire in respect to the internal diameter of the tube, coupled with the fact that the handle does not block the entrance end of the tube, it will be clear that once the tube is inserted and the head 18 moved to a retaining position, the tube remains unobstructed to the passage of liquid into or out of the tube, so that the cavity into which the tube is inserted may be readily drained, or instruments or medicinal applicators may be extended through the tube and into the bottom of the cavity.

To remove the tube from the cavity, it is only necessary to return the head 18 to seated position at the inner end of the tube which may be effected by pulling the wire outwardly as illustrated in Fig. 1. With the head seated on the tube, it no longer acts as a retention means, and consequently the tube may be readily withdrawn from the cavity.

Although I have herein shown and described only one form of dilator embodying my invention, it is to be understood that various changes and modifications may be made herein without departing from the spirit of the invention and the spirit and scope of the appended claim.

I claim:

A dilator comprising a linear tube having a tapered head normally projecting from the tube at its leading end, a normally curved wire connected to the head and extending through the tube for moving the head to seat against the leading end of the tube to facilitate the insertion of the tube into a cavity, and for moving the head to a projected position beyond the leading end of the tube, said wire normally tending to assume a curved form so that when the head is projected it will occupy an offset position and a further offset position in following the curvature of the cavity being dealt with, and a handle on the wire positioned to abut the rear end of the tube so as to coact with the wire and head in retaining the tube against displacement from the cavity.

JACOB J. CANTOR.